US005546805A

United States Patent [19]
Swartz et al.

[11] Patent Number: 5,546,805
[45] Date of Patent: Aug. 20, 1996

[54] ANGLE AND ANGULAR ACCELERATION SENSORS

[75] Inventors: Harold L. Swartz; Jane E. Anderson, both of, Springerville, Ariz.

[73] Assignee: Coyote Engineering Services, Inc., Springerville, Ariz.

[21] Appl. No.: 289,636

[22] Filed: Aug. 12, 1994

[51] Int. Cl.$^6$ ................................................. G01P 15/00
[52] U.S. Cl. ................................. 73/514.02; 73/514.32; 361/280
[58] Field of Search ............................ 73/517 A, 517 B, 73/517 R, 514.02, 514.32, 652, 514.01; 33/366; 361/280, 281; 257/419

[56] References Cited

U.S. PATENT DOCUMENTS

| | | | |
|---|---|---|---|
| 4,483,194 | 11/1984 | Rudolf | 73/517 R |
| 5,006,487 | 4/1991 | Stokes | 73/517 R |
| 5,092,174 | 3/1992 | Reidemeister et al. | 73/517 R |
| 5,095,752 | 3/1992 | Suzuki et al. | 73/517 R |
| 5,115,291 | 5/1992 | Stokes | 73/517 R |
| 5,226,321 | 7/1993 | Varnham et al. | 73/517 A |
| 5,233,213 | 8/1993 | Marek | 73/517 A |
| 5,243,861 | 9/1993 | Kloeck et al. | 73/517 R |
| 5,381,300 | 1/1995 | Thomas et al. | 73/517 R |

*Primary Examiner*—Hezron E. Williams
*Assistant Examiner*—Richard A. Moller
*Attorney, Agent, or Firm*—William E. Hein

[57] ABSTRACT

Angle and angular acceleration sensors are fabricated as a layered sandwich structure having a central sensing plate, left and right insulating spacers positioned outside the sensing plate, left and right driver plates positioned outside the insulating spacers, and left and right molded plastic housing shells positioned outside the driver plates for sealing the sensor structure. In an angle sensor embodiment of the invention, the sensing plate includes a peripheral frame and a central plate area mechanically connected to one side of the peripheral frame by way of a pair of beams that serve as a hinge to allow the central plate area of the sensing plate to rotate toward and away from the driver plates sandwiched on either side thereof. In an angular acceleration sensor embodiment of the invention, the sensing plate includes a peripheral frame and a central plate area divided into upper and lower halves, each of which is mechanically connected to the frame by way of a pair of beams that extend inwardly from two opposite sides of the frame and that similarly serve as a hinge to allow the upper and lower halves of the central plate to rotate toward and away from the adjacent driver plates.

11 Claims, 4 Drawing Sheets

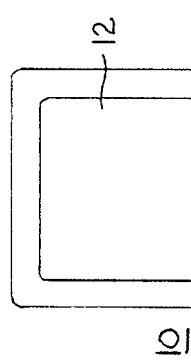
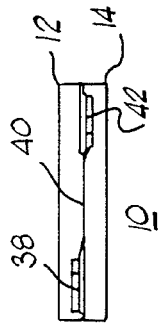
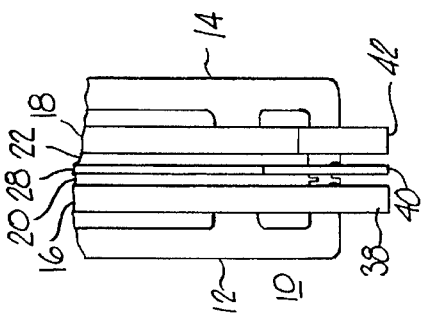
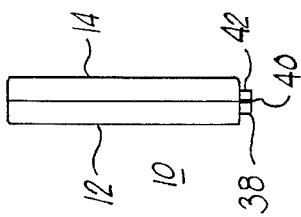
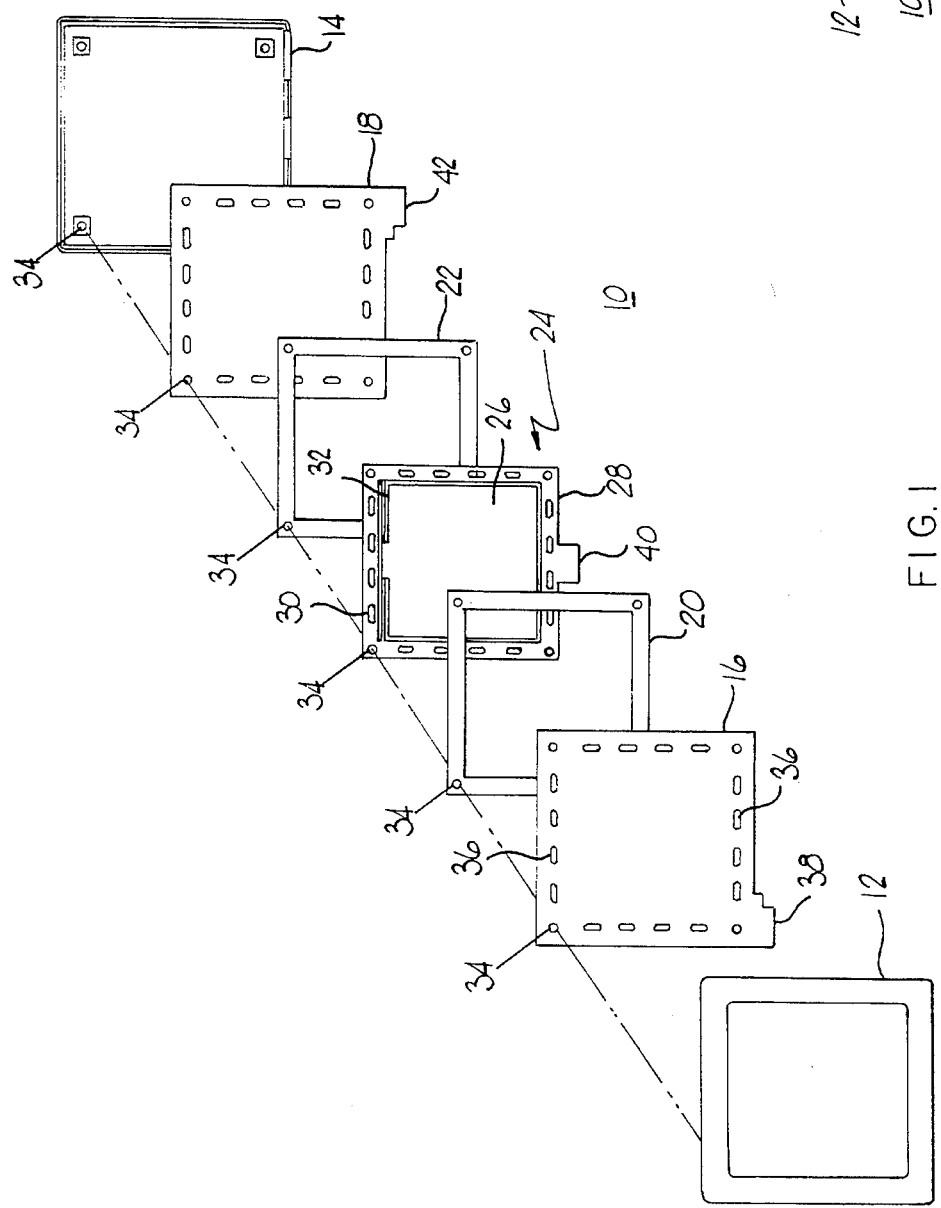

ANGLE AND ANGULAR ACCELERATION SENSORS

BACKGROUND AND SUMMARY OF THE INVENTION

This invention relates generally to devices commonly referred to as angle sensors, clinometers or accelerometers and more particularly to improved angle and angular acceleration sensors that utilize a test mass/suspension element manufactured by means of a chemical milling process. The position of the test mass is measured by capacitive, inductive or optical means, for example, utilizing plates mounted on one or both side of the test mass. The angle sensor of the present invention measures the angle between its case and the gravity, or total acceleration, vector. In an alternative embodiment of the invention, angular acceleration may be measured. Either device may be constructed to operate in an open loop or closed loop configuration.

Various angle sensors are known in the prior art. Typically, they comprise fluid filled electrolytic or capacitive devices. Exemplary of the electrolytic devices are the Spectron and Fredericks glass vials using platinum electrodes and a fluid comprising alcohol with dissolved metallic salts. These prior art devices suffer from relatively high cost, slow response time, and fragility. Exemplary of the prior art fluid filled capacitive devices is the Lucas Accustar, which also suffers from slow response time, limited range when used as an accelerometer, and relatively poor measurement repeatability and stability.

It is therefore the principal object of the present invention to provide improved low cost angle and angular acceleration sensors exhibiting virtually unlimited range and excellent short and long term stability and high frequency response.

This and other objects are accomplished in accordance with the illustrated preferred embodiments of the present invention by providing a layered sandwich sensor structure having a central sensing plate, left and right insulating spacers positioned outside the sensing plate, left and right driver plates positioned outside the insulating spacers, and left and right molded plastic housing shells positioned outside the driver plates for sealing the sandwich sensor structure. In an angle sensor embodiment of the invention, the sensing plate includes a peripheral frame and a central plate area mechanically connected to one side of the peripheral frame by way of a pair of torsion bars that serve as a hinge to allow the central plate area of the sensing plate to rotate toward and away from the driver plates sanwiched on either side thereof. In an angular acceleration sensor embodiment of the invention, the sensing plate includes a peripheral frame and a central plate area divided into upper and lower halves, each of which is mechanically connected to the frame by way of a pair of torsion bars that extend inwardly from two opposite sides of the frame and that similarly serve as a hinge to allow the upper and lower halves of the central plate area to rotate toward and away from the adjacent driver plates. Though the preferred embodiments of both the angle and angular acceleration sensors of the present invention employ torsion bars to hinge the central plate area, other beam configurations which allow the central plate area to be deflected toward and away from the driver plates may be utilized.

The atmosphere inside either the angle or angular acceleration sensor may comprise air, an inert gas, or a dielectric fluid for increased capacitance and/or increased damping in high vibration environments. Further, it is not required that two driver plates and two spacers be employed in the angle and angular acceleration sensors of the present invention. A simplified yet functional sensor may be constructed using only one driver plate, one spacer, and one sensor plate.

BRIEF DESCRIPTION OF THE DRAWINGS

FIG. 1 is an exploded view of the sandwich elements comprising an angle sensor constructed in accordance with one embodiment of the present invention.

FIGS. 2A–D are front, bottom, right side, and enlarged right side views, respectively, of the angle sensor of FIG. 1, illustrated in its assembled form.

DESCRIPTION OF THE PREFERRED EMBODIMENTS

Figure 4A:
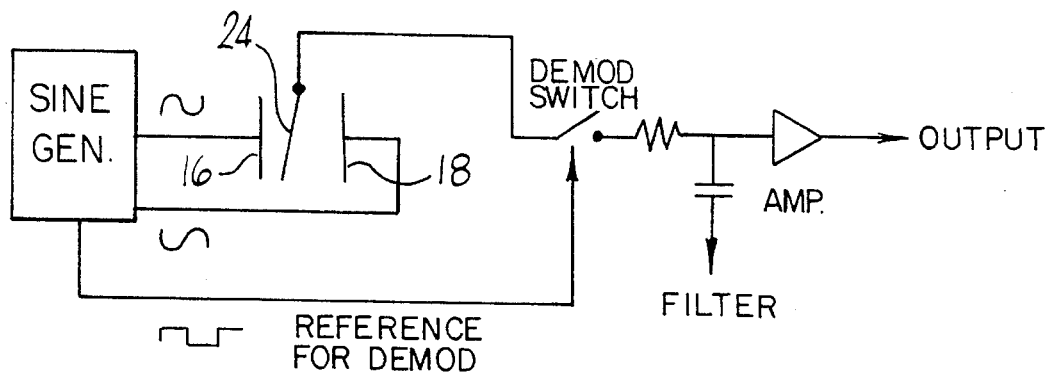
FIGS. 4A and 4B are simplified schematic diagrams of interface circuits in which the angle sensor and angular acceleration sensor of the present invention may be employed.

Referring now to FIG. 1, there is shown an exploded view of a sandwiched angle sensor 10 comprising left and right molded plastic housing shells 12 and 14, left and right brass driver plates 16 and 18, two insulating spacers 20 and 22, and a centrally positioned beryllium copper sensing plate 24. Sensing plate 24 is fabricated of chemically etched beryllium copper and includes a 1-inch square central area 26 that is free to rotate when tilted about the sensitive axis. A peripheral frame 28 of sensing plate 24 supports a pair of torsion bars 30 and 32 that serve to connect central area 26 to frame 28. Alignment holes are provided in the corners of frame 28 as well as in the other sandwich elements of FIG. 1. Beryllium copper of 0.010" thickness is the preferred material for fabrication of sensing plate 24, based on such characteristics as dimensional stability, solderability, spring properties, and strength. However, other electrically conducting materials may be used instead. The dimensions of the torsion bars 30, 32 and the thickness of the sensing plate 24 have been selected based on computer finite element modes and extensive testing. The dimensions of the torsion bars 30, 32 are also selected Such that full deflection of central area 26 of sensing plate 24 occurs at about + or −90 degrees of tilt. Any range of acceleration may be accommodated by appropriately changing the width, position, and/or shape of the torsion bars 30, 32 or by selecting a different beam configuration.

Sensing plate 24 is sandwiched between the two insulating spacers 20, 22 that may comprise 0.020" thick fiberglass, ceramic or molded plastic, for example. Insulating spacers 20, 22 allow the central area 26 of sensing plate 24 to rotate slightly without touching either of the two brass driver plates 16, 18 positioned outside of insulating spacers 20, 22. Brass driver plates 16, 18 are stamped from 0.045" thick material to include alignment holes 34 in the corners thereof, as well as a plurality of slots 36 that serve to minimize the parasitic capacitance between sensing plate 24 and the two brass driver plates 16, 18. Materials other than the preferred materials described above may be utilized to fabricate the insulating spacers 20, 22 and the driver plates 16, 18. For example, the spacers 20, 22 may be fabricated of metal, and the driver plates 16, 18 may comprise printed circuit wiring boards such that the sensing plate 24 is electrically insulated from the driver plates 16, 18. Connection tabs 38, 40, 42 are formed as extensions of the bottom edges of brass driver plate 16, sensing plate 24, and brass driver plate 18, respectively.

When assembled, angle sensor 10 appears as illustrated in the front, bottom, side, and enlarged side views of FIGS. 2A–D, respectively. One of the molded plastic housing shells 12, 14 includes pins inserted into each of four corner alignment holes 34 to receive the corresponding alignment holes 34 in each of the four corners of each of the interior sandwich elements 16, 18, 20, 22, 24 to thereby align all of the sandwich elements and to facilitate ease of manufacture. When all of the sandwich elements have been stacked in place, the two molded plastic housing shells 12, 14 are ultrasonically welded together, thereby permanently aligning, sealing, and maintaining compression of the sandwich elements. Molded plastic housing shells 12, 14 are not required for functionality of angle sensor 10. Other means of joining the driver plates 16 and 18, spacers 20 and 22, and sensing plate 24, such as rivets, screws, adhesive, and solder, for example, may be employed.

Figure 3A:
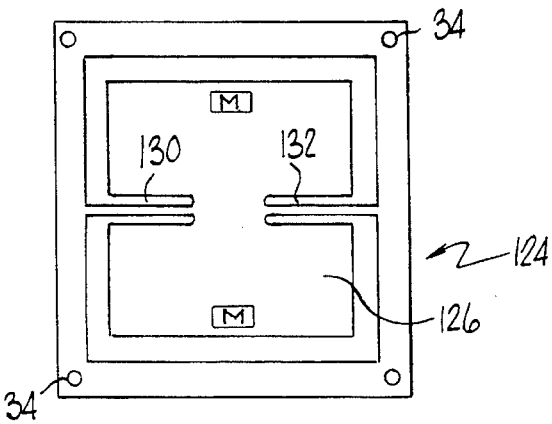
FIG. 3A illustrates a sensing plate employed in an angular acceleration sensor constructed in accordance with an alternative embodiment of the present invention.

Referring now to FIG. 3A, there is shown an alternative embodiment of sensing plate 24 of FIG. 1 that permits use of the device of the present invention as an angular acceleration sensor. In this alternative embodiment, a sensing plate 124 is formed to include a pair of torsion bars 130, 132 centrally positioned with respect to a central area 126 of sensing plate 124 for measuring angular acceleration. In this embodiment, a pair of brass driver plates 118, 119 are positioned on one side of sensing plate 124, as illustrated in the assembled angular acceleration sensor diagram of FIG. 3B. Driver plate 118 faces the upper half of central area 126 of sensing plate 124, while driver plate 119 faces the lower half of central area 126 of sensing plate 124. An additional pair of brass driver plates 116, 117 may be positioned on the other side of sensing plate 124 to increase the capacitance. Driver plates 116, 117 and 118, 119 may be fabricated by etching on a conventional printed circuit board. A pair of molded plastic housing shells 112, 114 serve the same function as molded plastic housing Shells 12, 14 illustrated i n FIG. 1.

Figure 3B:
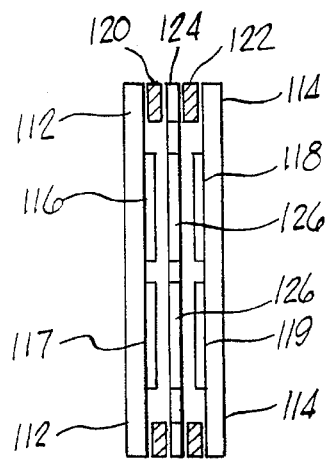
FIG. 3B is a partial cross section diagram of an assembled angular acceleration sensor employing the sensing plate of FIG. 3A.

Sensitivity of the angular acceleration sensor of FIGS. 3A–B may be increased by adding mass to both the upper and lower portions of central area 126 of sensing plate 124, by changing the width, position, and/or shape of the two torsion bars 130, 132 or by selecting a different beam configuration. During operation of the angular acceleration sensor of FIGS. 3A–B, angular acceleration about the axis of torsion bars 130, 132 causes the central area 126 of sensing plate 124 to be deflected so that the upper one-half thereof moves toward or away from driver plate 116, while the lower one-half thereof moves away from or toward driver plate 117.

The most straightforward analog circuitry in which the angle sensor or angular acceleration sensor of the present invention may be employed is illustrated in FIG. 4A. In practice, this circuitry may be fabricated using discrete components or it may comprise an off-the-shelf integrated circuit, such as the Philips 5521A LVDT driver and demodulator.

Figure 4B:
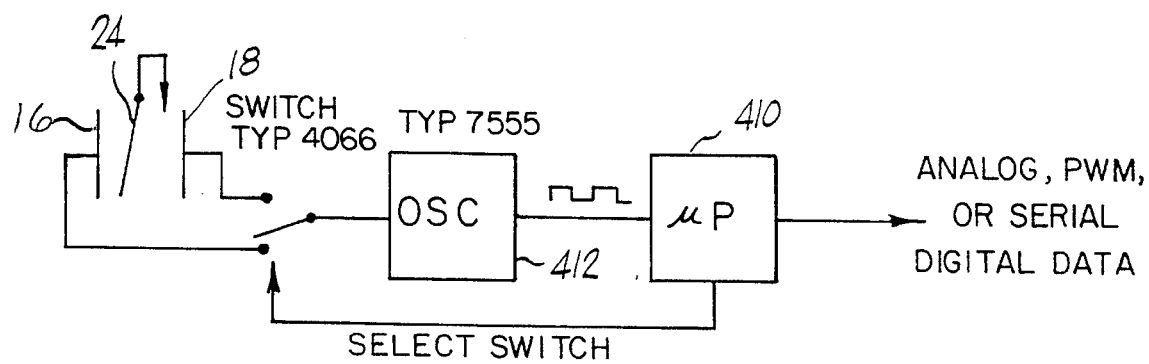

A typical digital interface employing the angle sensor or angular acceleration sensor of the present invention is illustrated in FIG. 4B. A conventional microprocessor 410 first selects the left driver plate 16 and then the right driver plate 18, which controls the frequency of an oscillator 412 by virtue of the capacitance to the sensing plate 24. Since this capacitance varies as a function of tilt angle, so does the ratio of the "left" and "right" frequencies. Microprocessor 410 may convert this ratio into any desired type of output.

Figure 4C:
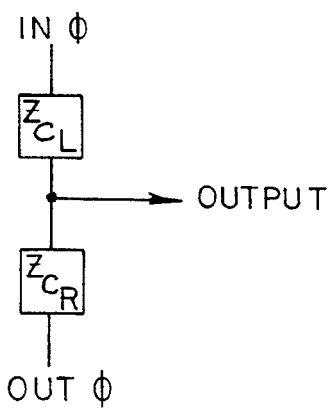
FIGS. 4C and 4D are equivalent circuit diagrams of the sensors employed in the interface circuits of FIGS. 4A and 4B, respectively.
Figure 4D:
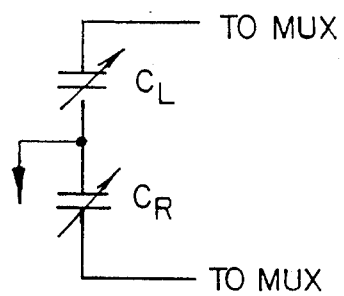

Equivalent circuits for the angle sensor or angular acceleration sensor employed in the interface circuits of FIGS. 4A and 4B are illustrated in FIGS. 4C and 4D, respectively.

Figure 5:
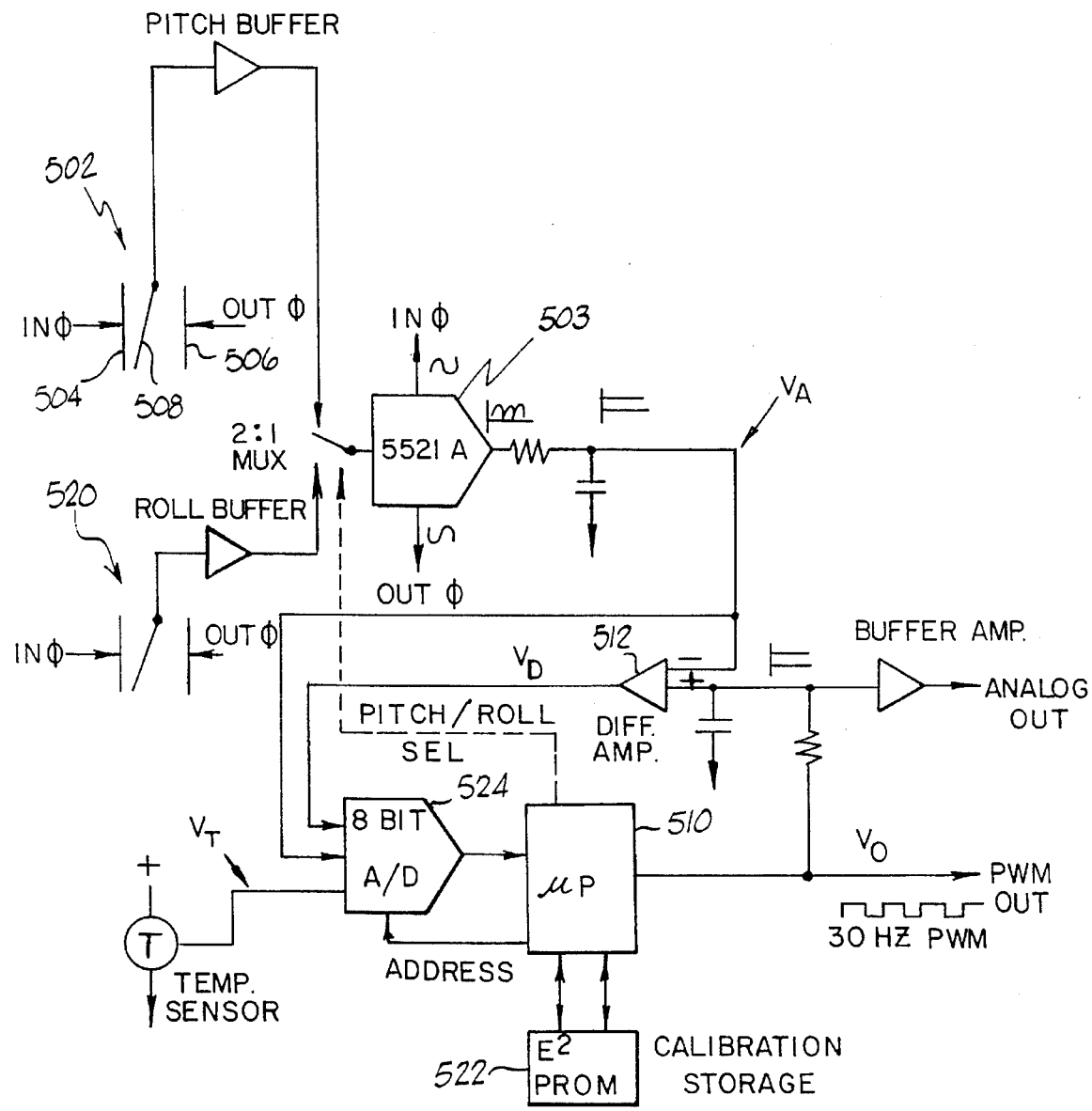
FIG. 5 is a detailed schematic circuit diagram of a pitch and roll circuit employing the angle sensor and angular acceleration sensor of the present invention.

A pitch and roll interface circuit employing the angle sensor and angular acceleration sensor of the present invention is illustrated in FIG. 5. Operation of this pitch and roll circuit is described by first assuming that a pitch sensor 502 is selected. The 20-KHz in-phase and out-of-phase excitation signals from a Philips 5521 LVDT driver and demodulator 503 are applied to the left and right driver plates 504 and 506, respectively, of pitch sensor 502. Pitch sensor 502 then acts as a halfwave bridge with the output proportional to the position of the pendulous sensing plate 508 and, thus, to tilt angle. The 5521 amplifies, demodulates, and then filters the signal so that an analog signal $V_A$ that is proportional to pitch tilt angle is obtained. A microprocessor 510 then performs analog to digital conversions on the signals $V_A$, $V_T$ (temperature), and $V_D$. $V_D$ is the amplified difference between the desired output $V_A$ and the filtered output signal $V_O$. Microprocessor 510 then uses the signal $V_D$ to effect a fine adjustment of the pulse width modulated output signal $V_O$ until signal $V_D$ is driven to null, i.e. $V_O$ (filtered)=$V_A$. The advantage of the above-described technique is that the gain factor of the differential amplifier 512 that produces signal $V_D$ allows the use of a low cost 8-bit analog to digital converter 524 on board microprocessor 10 instead of requiring a more expensive external 12-bit analog to digital converter.

Microprocessor 510 next selects a roll sensor 520, and the process described above when pitch sensor 502 is selected is repeated for the roll axis. The roll axis circuitry is not illustrated for the purpose of simplicity, but it includes a filter, differential amplifier, and analog output buffer that is analogous to the circuit illustrated in connection with the pitch axis. The previously described process assumes that no corrections are made for linearity and temperature dependence of the null condition. In reality, there would have been stored in an $E^2$ PROM 522 during a prior "learning" mode of operation two lookup tables (one each for pitch and roll) which describes the required correction for linearity and null shift as a function of temperature. Such a lookup table would be similar to the following:

| TILT ANGLE (DEGREES) | TEMPERATURE (DEGREES CENTIGRADE) | | | | | |
| --- | --- | --- | --- | --- | --- | --- |
|  | 0 | 10 | 20 | 30 | 40 | 50 |
| −10 | +.015 | +.010 | +.005 | .000 | −.007 | −.012 |
| −8 | +.011 | etc |  |  |  |  |
| −6 | +.008 |  | etc |  |  |  |
| −4 | +.005 |  |  |  |  |  |
| −2 | +.003 |  |  | etc |  |  |
| 0 | .000 |  |  |  |  |  |
| +2 | −.004 |  |  |  |  |  |
| +4 | −.009 |  |  |  |  |  |
| +6 | −.011 |  |  |  |  |  |
| +8 | −.013 |  |  |  |  |  |
| +10 | −.0017 |  |  |  |  |  |

Thus, when the microprocessor 510 reads values for $V_D$, $V_A$, and $V_T$ via the analog to digital converter 524, it would use $V_T$ (temperature) and $V_A$ (desired output before null and linearity corrections) to select from the above lookup table the exact correction by interpolating between table values. It would then adjust the pulse width modulated output signal $V_O$ until signal $V_D$ is driven not to null but to the value obtained from PROM 522, which includes the required null and linearity correction.

Figure 6A:
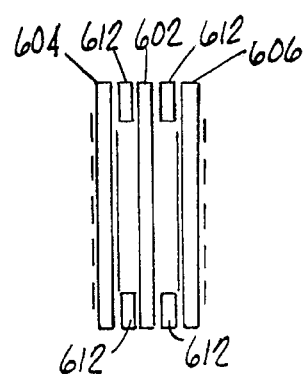
FIG. 6A is a diagram illustrating an assembled angle or angular acceleration sensor that may be employed in a closed loop circuit application.
Figure 6B:
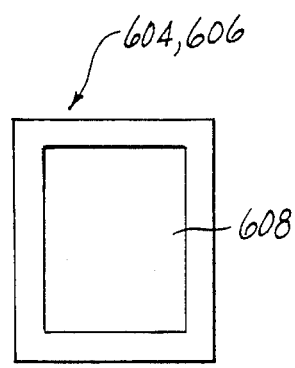
FIGS. 6B–D are diagrams illustrating the configuration of the front and back sides of each of the driver plates employed in the sensor of FIG. 6A.
Figure 6C:
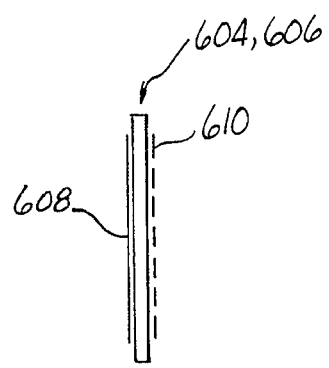
Figure 6D:
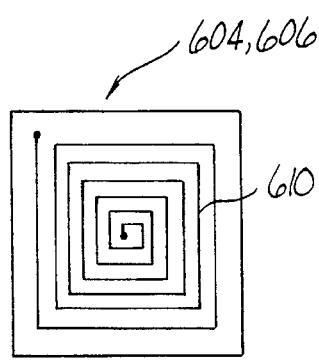

While the above detailed description of the angle sensor and angular acceleration sensor of the present invention relates to open loop operation of such sensors, it will be appreciated by those persons skilled in the art that closed loop operation of both of these sensors is practical. Closed loop operation may be accomplished by using a DC voltage applied to the driver plates for electrostatic means or by using coils driving through the driver plates for magnetic means. Referring to the assembled sensor illustrated in FIG. 6A, in the case of magnetic means, the sensing plate 602 must be fabricated of a magnetic material such as magnetic stainless steel, for example, and the driver plates 604, 605 must be fabricated of a non-magnetic material such as copper. Each of the driver plates 604, 606 may comprise, for example, a double-sided printed circuit board, as illustrated in FIGS. 6B–D, having a square copper plate area 608 centrally located on one side of the board and an etched coil 610 for magnetic loop closure located on the other side of the board. Spacers 612 are positioned between the driver plates 604, 606 and the sensing plate 602. The sensing plate 602 of the sensor illustrated in FIGS. 6A–D may be deflected periodically in the performance of a self-test feature required for critical accelerometer applications such as automobile air bag systems.

We claim:

1. An angle sensor formed as a layered sandwich structure of rectangularly-shaped elements, comprising:

a metallic central sensing plate;

left and right spacers positioned on either side of said central sensing plate;

left and right driver plates positioned outside said left and right spacers, respectively; and electrical connection means for electrically connecting said central sensing plate and said left and right driver plates to external angle measurement circuitry;

said central sensing plate comprising a peripheral frame and a central plate area, the central plate area being uniformly spaced away from the peripheral frame along the entirety of top and bottom edges of the central plate area and being uniformly spaced away from the peripheral frame along substantially the entirety of left and right edges of the central plate area, the central plate area being connected to the peripheral frame only by way of a pair of axially aligned torsion bars, each of the torsion bars extending inwardly at the top edge of the central plate area from left and right inner edges, respectively, of the peripheral frame to allow the central plate area to rotate toward and away from said driver plates when said angle sensor is tilted with respect to the axis of the pair of torsion bars.

2. An angle sensor as in claim 1, further comprising left and right housing shells positioned outside said left and right driver plates, respectively, for sealing said angle sensor.

3. An angle sensor as in claim 1, wherein said left and right spacers and said left and right driver plates are fabricated of materials chosen to electrically insulate said central sensing plate from said left and right driver plates.

4. An angle sensor as in claim 3, wherein:

said central sensing plate comprises beryllium copper;

said left and right driver plates comprise brass; and said left and right spacers comprise an electrical insulator.

5. An angle sensor as in claim 2, wherein said left and right housing shells comprise a molded plastic material.

6. An angle sensor as in claim 1, wherein said electrical connection means comprises an electrical connection tab extending from each of said central sensing plate and said left and right driver plates.

7. An angular acceleration sensor formed as a layered sandwich structure of rectangularly-shaped elements, comprising:

a metallic central sensing plate;

left and right spacers positioned on either side of said central sensing plate;

left and right driver plates positioned outside said left and right spacers, respectively, each of said left and right driver plates being divided into upper and lower driver plate areas; spacers, respectively; and electrical connection means for electrically connecting said central sensing plate and said left and right driver plates to external angular acceleration measurement circuitry;

said central sensing plate comprising a peripheral frame and a central plate area, the central plate area being uniformly spaced away from the peripheral frame along the entirety of top and bottom edges of the central plate area and being uniformly spaced away from the peripheral frame along substantially the entirety of left and right edges of the central plate area, the central plate area being connected to the peripheral frame only by way of a pair of axially aligned torsion bars, each of the torsion bars extending inwardly from left and right inner edges, respectively, of the peripheral frame at points midway along the left and right inner edges of the peripheral frame to divide the central plate area into upper and lower central plate areas to allow the upper and lower central plate areas to rotate toward and away from said upper and lower driver plate areas when said angular acceleration sensor is tilted with respect to the axis of the pair of torsion bars.

8. An angular acceleration sensor as in claim 7, further comprising left and right housing shells positioned outside said left and right spacers, respectively, for sealing said angular acceleration sensor.

9. An angular acceleration sensor as in claim 7, wherein said left and right spacers and said left and right driver plates are fabricated of materials chosen to electrically insulate said central sensing plate from said left and right driver plates.

10. An angular acceleration sensor as in claim 9, wherein:

said central sensing plate comprises beryllium copper;

said left and right driver plates comprise brass; and said left and right spacers comprise an electrical insulator.

11. An angular acceleration sensor as in claim 8, wherein said left and right housing shells comprise a molded plastic material.

* * * * *